No. 772,007. PATENTED OCT. 11, 1904.
W. THEIS.
STOP COCK.
APPLICATION FILED NOV. 2, 1903.
NO MODEL. 2 SHEETS—SHEET 1.

Witnesses:
Arthur Zumpe
Fred Unfricht

Inventor:
Wilhelm Theis
by Frank v. Briesen Att'y.

No. 772,007. PATENTED OCT. 11, 1904.
W. THEIS.
STOP COCK.
APPLICATION FILED NOV. 2, 1903.
NO MODEL. 2 SHEETS—SHEET 2.
*Fig: 3.*
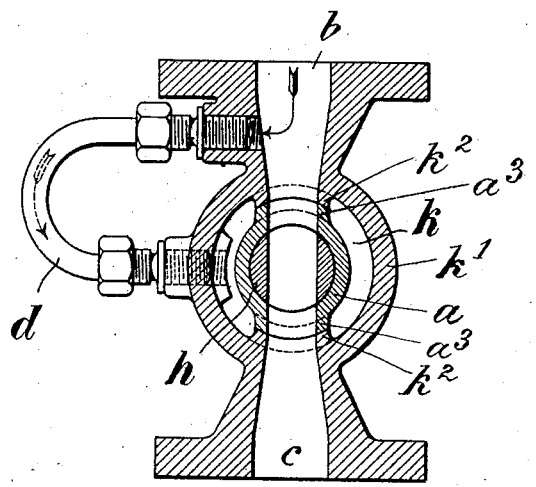
Witnesses: Inventor:
Arthur Zumper. Wilhelm Theis
Fred. Vonfricht. by Frank v. Briesen Att'y.

No. 772,007.

Patented October 11, 1904.

UNITED STATES PATENT OFFICE.

WILHELM THEIS, OF DÜSSELDORF, GERMANY.

STOP-COCK.

SPECIFICATION forming part of Letters Patent No. 772,007, dated October 11, 1904.

Application filed November 2, 1903. Serial No. 179,488. (No model.)

*To all whom it may concern:*

Be it known that I, WILHELM THEIS, a citizen of Germany, residing at Düsseldorf, Germany, have invented certain new and useful Improvements in Stop-Cocks, of which the following is a specification.

Stop-cocks when used for the passage of hot fluid or of steam suffer from a defect which not unfrequently leads to accidents—viz., the expansion of the cone as soon as it is turned open to let the steam or hot fluid pass. This expansion takes place before the casing inclosing the cone can expand, and the consequence is that the latter is jammed so tightly within the said casing that it becomes almost impossible and even dangerous to turn it.

My invention relates to an improved stop-cock which is provided with a casing that contains a compartment or jacket connected with the pipe supplying the steam or hot fluid, and its object is to do away with the above-mentioned trouble. Moreover, my improved cock is provided with means for holding the cone in its place and prevent its settling. As above mentioned, the casing around the cock is provided with a compartment which is in direct communication with the steam-supply pipe. By allowing the steam or hot fluid to enter the said compartment a few minutes before opening the cone the casing will become warm and expand accordingly, so that when the steam is made to pass through the cock and by its heat causes the cone to expand the expansion of both the cone and the casing will be equal, and the opening and closing of the passage will no longer meet with difficulties.

Figure 1:
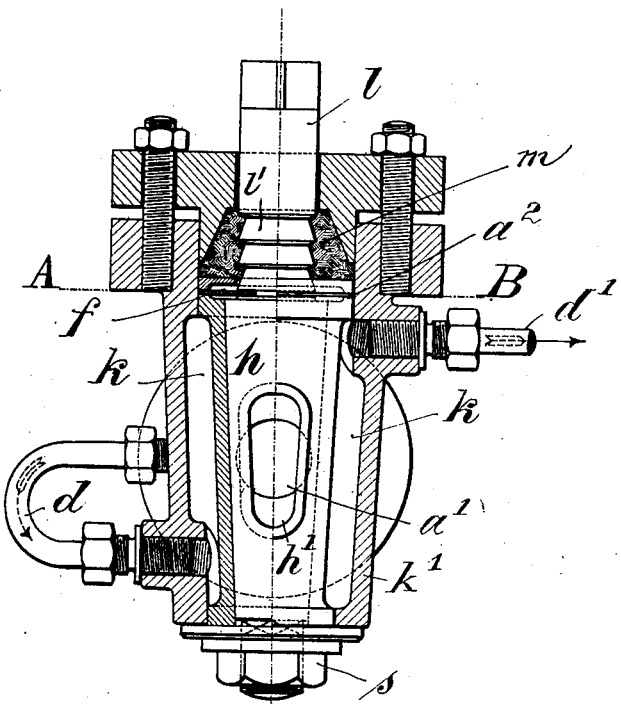
Figure 2:
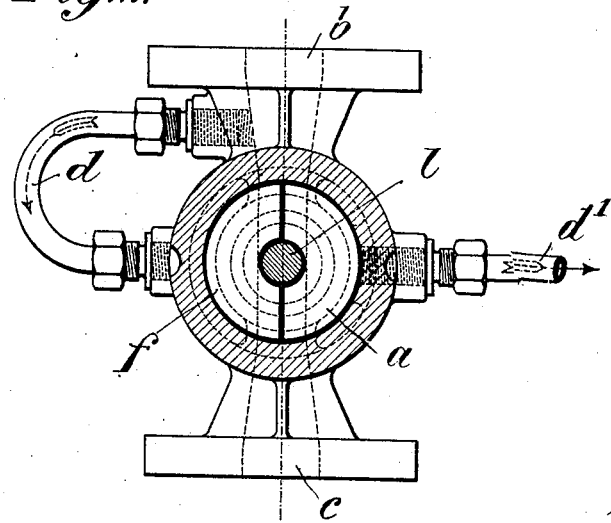

In the accompanying drawings, Figure 1 is a longitudinal section, partly in elevation, of my improved stop-cock; Fig. 2, a cross-section on line A B, Fig. 1; and Fig. 3, a similar section through the center of the plug-perforation.

The letter $a$ represents a tapering valve-casing communicating by ports $a'$ with steam or hot fluid inlet $b$ and outlet $c$, as usual. Within the casing $a$ is free to turn the tapering plug $h$, having stem $l$ and perforation $h'$. When the opening in the plug registers with the ports $a'$ the cock is open, while when the perforation is out of alinement with the ports the cock is closed. The casing $a$ is surrounded by a shell $k'$, provided with a pair of inwardly-projecting oval flanges $k^2$. These flanges are arranged diametrically opposite each other at the steam inlet and outlet, respectively, and are engaged by corresponding outwardly-projecting flanges $a^3$ of casing $a$. In this way there is formed between the casing $a$ and the shell $k'$ an annular heating jacket or chamber $k$. The flanges $k^2$ $a^3$ form jointly an inlet-passage through chamber $k$ from the pipe $b$ to the cock $h$ and an outlet-passage from the cock to the pipe $c$. The jacket $k$ receives steam or hot fluid from the inlet $b$ by means of a by-pass $d$ and discharges the same at a point opposite the inlet through an exhaust $d'$. Thus when steam, &c., is admitted to the jacket previous to the opening of the cock the casing will be expanded sufficient to prevent jamming of the plug. In order to avoid a settling of the plug within the casing when the latter becomes distended, I provide a divided disk-spring $f$ or a spring of other construction. This spring engages a groove in the stem $l$ and bears upon an offset $a^2$ of casing $a$. The spring $f$ will draw the plug upward without preventing the manipulation of the usual tightening-nut $s$. The plug-spindle $l$ is stepped, as at $l'$, and is here surrounded by a packing $m$. This packing assists the spring $f$ in preventing a jamming of the plug, while the steps $l'$ prevent the escape of the steam along the surface of the spindle.

What I claim is—

1. In a stop-cock, the combination of a flanged shell, with a flanged casing to form an intervening annular chamber, a plug within the casing, and means for admitting a heating medium to the chamber, substantially as specified.

2. In a stop-cock, a flanged shell and a flanged casing that form an intervening annular chamber, and a passage through said chamber, combined with a plug inclosed by the casing, inlet and exit pipes, and a by-pass that connects the inlet-pipe with the chamber, substantially as specified.

3. In a stop-cock, the combination of a casing having an inlet and outlet, with an inclosed spring-influenced plug having a stepped spindle, a jacket surrounding the casing, a by-pass for connecting the inlet with the jacket, and a packing surrounding the plug-spindle, substantially as specified.

In witness whereof I have hereunto subscribed my name in the presence of two witnesses.

WILHELM THEIS.

Witnesses:
 WILLIAM ESSENWEIN,
 PETER LIEBER.